March 6, 1934.  H. HASTINGS ET AL  1,950,142
GAUGE
Filed June 17, 1932
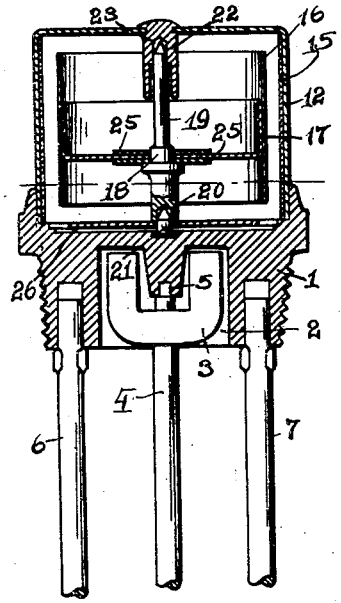
Fig. 3.
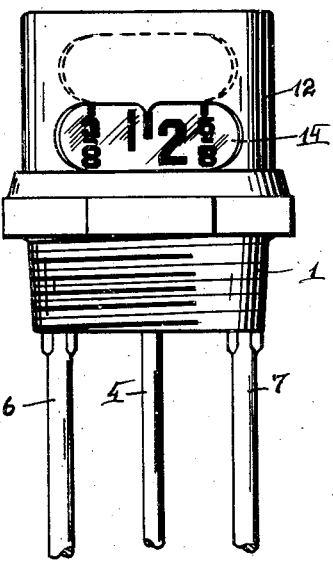
Fig. 2.
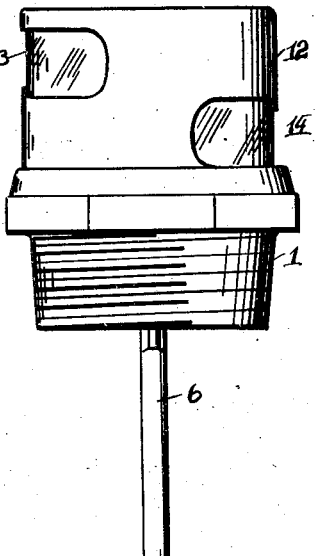
Fig. 1.
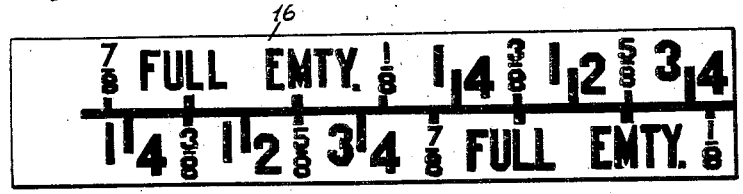
Fig. 5
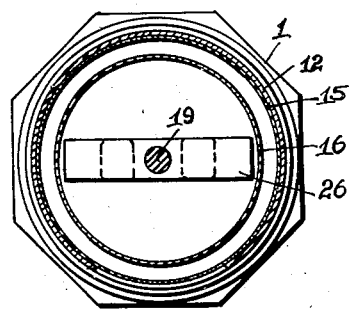
Fig. 4.
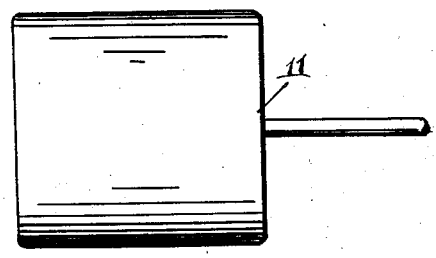
INVENTORS
HERBERT HASTINGS
LEONARD I. HALL
BY
ATTORNEY Patented Mar. 6, 1934

1,950,142

UNITED STATES PATENT OFFICE 1,950,142

GAUGE

Herbert Hastings, Brighton, and Leonard I. Hall, Rochester, N. Y.; said Hall assignor to Rochester Manufacturing Co., Inc., Brighton, N. Y.

Application June 17, 1932, Serial No. 617,826

10 Claims. (Cl. 116—118)

This invention relates to liquid level gauges and has for its object to provide a novel construction for the indicating mechanism for such a gauge.

Another object of this invention is to provide a liquid level gauge with a multiple indicating dial which is arranged and operated in such a manner that the same indications are given at different points of the dial housing.

Another object of this invention is to so construct the dial housing that the indications of the gauge can be read on opposite sides thereof.

This and other objects of the invention will become more readily apparent from the detailed description thereof which follows, reference being had to the accompanying drawing in which Figure 1 is a side elevation of the complete liquid level gauge.

Figure 2 is a front elevation of the dial housing with a portion of its indicator operating shaft and the supporting members thereof.

Figure 3 is a vertical sectional view of the dial housing, its cylindrical dial and operating mechanism thereof.

Figure 4 is a horizontal sectional view of the dial housing, the section being taken on the line 4—4 of Figure 3.

Figure 5 illustrates a lay out of the cylindrical dial.

In the several figures of the drawing like reference numerals indicate like parts.

The liquid level gauge forming the subject matter of our present invention is especially adapted for use where it is desirable to be able to read the indication of the gauge from different angles of the dial housing of the gauge. Thus for example on fuel oil storage tanks for oil burners, which tanks are usually located on the inside of the building close to the wall thereof, the indication of the gauge may be read at a distance from the tank thru a window from without the building as well as at a distance from the tank from within the building. The person supplying the oil as well as the person receiving the oil can thus conveniently observe the oil level in the tank from different stations.

As illustrated in the several figures the liquid level gauge comprises the body member 1 which is cast from a non-magnetic metal. This body member is provided on the under side with a magnet chamber 2 in which the U shaped magnet 3 is mounted to oscillate. The magnet is carried on the vertical operating shaft 4 which is mounted with one end in the bearing 5 located centrally in the magnet chamber and is pivotally supported at the other end by the supporting members 6 and 7. These supporting members are suitably anchored in the body member 1 at diagonally opposite points of the magnet chamber 2. The operating shaft 4 carries the pinion 8 which meshes with the segmental gear 9 which is also pivotally supported by the supporting members 6 and 7 and has the float arm 10 attached thereto. A float 11 is carried by the outer end of the float arm 10 and operates the segmental gear 9 to rotate the pinion 8, operating shaft 4 and magnet 3 on the rise or fall of the liquid level in the tank on which the gauge is mounted.

On top of the body member 1 is mounted the cylindrical dial housing or cap 12 which is telescoped with its open bottom into a recess in said body member and held firmly anchored in place therein. The cylindrical wall of the dial housing or cap 12 is provided with two sight openings 13 and 14 at diametrically opposite sides thereof with one sight opening near the top and the other near the bottom of the housing or cap. These sight openings are closed by a transparent cylinder 15 located within the housing or cap.

Within the housing or cap 12 is located the cylindrical dial 16 carried by the cup shaped rocker 17 which in turn is supported on the shoulder 18 of the dial stem 19. In the lower end of the dial stem 19 is provided the pointed bearing 20 and into this bearing projects the pointer pivot 21 to pivotally support the dial stem. A stationary hub 22 is mounted in the top of the housing or cap 12 and the pointed upper end of the dial stem projects into the pointed bearing 23 provided in this hub to guide and hold the upper end of the dial shaft in line with the pointer supporting stem 21 and causes the cylindrical dial to freely oscillate within the housing or cap 12 on the pointed end of the supporting stem. A pair of washers 25, 25, one on top and the other at the bottom of the rocker 17, serve to hold the rocker and in turn the cylindrical dial in a vertical position on the dial stem 19.

Carried by the dial stem 19 at the lower end thereof and close to the bottom of the recess in the body member 1, is the magnetized follower 26. The magnetic field created by the magnet 3 in the recess at the top of the body member thus magnetically alignes the follower 26 with the magnet and causes it to rotate therewith. In this way the rise and fall of the float 11 operates to rotate the cylindrical dial 16 and indicates thru the sight openings the position of the level within the tank.

As above pointed out the indications of the gauge may be read thru two sight openings, one at the front and the other at the back of the housing or cap. This is made possible by dividing the cylindrical dial into an upper and lower dial surface on which the corresponding calibrations are located diametrically opposite each other. Thus in the position of the gauge illustrated in Figures 1 and 2 in which the ½ mark of the lower dial surface is shown located in the center of the lower sight opening 14, the ½ mark on the upper dial surface will be located in the same position in the upper sight opening 13. In this way both the upper and lower dial surface can extend around the entire periphery of the cylindrical dial and make the use of large and readily visible indicating marks possible on each dial surface.

We claim:

1. A gauge having a vertically disposed housing with vertically spaced sight openings in the wall thereof, a dial carrier pivotally mounted at the top and bottom in said housing, a dial having vertically spaced dial calibrations mounted on said dial carrier in line with said sight openings in said housing and gauge operating means operating thru the bottom of said housing to rotate said dial.

2. A gauge having a vertically disposed housing with vertically and angularly spaced sight openings in the wall thereof, a vertically rotating dial mounted within said housing with vertically and angularly spaced calibrations in line with said sight openings, dial operating means at the bottom of said housing.

3. In combination with a gauge housing having vertically spaced sight openings, of a dial comprising a cylinder, vertically and angularly spaced series of dial calibrations concentrically arranged on said dial, a pivot shaft for said dial and bearing members for pivotally supporting said dial in a vertical position with its series of calibrations in line with said sight openings.

4. A gauge comprising a body member, a cylindrical dial pivotally supported at the top and bottom on said body member, a plurality of series of dial calibrations on said dial, a housing having a plurality of sight openings therein registering with said series of dial calibrations surrounding said dial, a float operated shaft pivotally mounted in said body member and means for transmitting the motion of said shaft to said dial.

5. A gauge comprising a body member, a cylindrical dial pivotally supported at the top and bottom on said body member, a float operated shaft pivotally suspended below said body member, and means for transmitting the motion of said shaft to said cylindrical dial.

6. A gauge comprising a body member, a housing mounted on top of said body member having a sight opening therein, a dial supporting stem, a cylindrical dial carried by said stem, a pivotal support for said stem carried on said body member for pivotally supporting said dial within said housing and a bearing member provided on said housing for pivotally guiding the free end of said supporting stem.

7. A gauge comprising a body member, a dial supporting stem pivotally mounted on said body member, a rocker carried by said stem and a cylindrical dial supported by said rocker.

8. A gauge comprising a body member, a dial supporting stem pivotally mounted on top of said body member, a cylindrical dial mounted on said stem, a magnet follower mounted on said stem radially thereto and a magnet pivotally mounted on said body member below said magnetic keeper to rotate said keeper and dial on the rotation of said magnet.

9. A gauge comprising a body member, a dial supporting stem pivotally mounted on said body member, a pair of hub washers carried by said supporting stem, a rocker mounted on said stem and held between said hub washers, a cylindrical dial surrounding the periphery of said rocker, a cylindrical housing surrounding said dial, and a bearing member carried by said cylindrical housing to hold said dial concentrically mounted within said housing.

10. A gauge comprising a body member, a pointed supporting member mounted on said body member, a dial supporting stem having an elongated bearing adapted to telescope over said pointed supporting member to pivotally support one end of said dial supporting stem, a fixed bearing member telescoped over the opposite end of said dial supporting stem to permit a freely rotating motion and a limited endwise movement for said supporting stem, and a dial carried on said supporting stem.

HERBERT HASTINGS.
LEONARD I. HALL.